Jan. 19, 1971     J. D. HOSSFELD     3,555,929
EXTENDED ROOT FLEXSPLINES
Filed Aug. 2, 1968
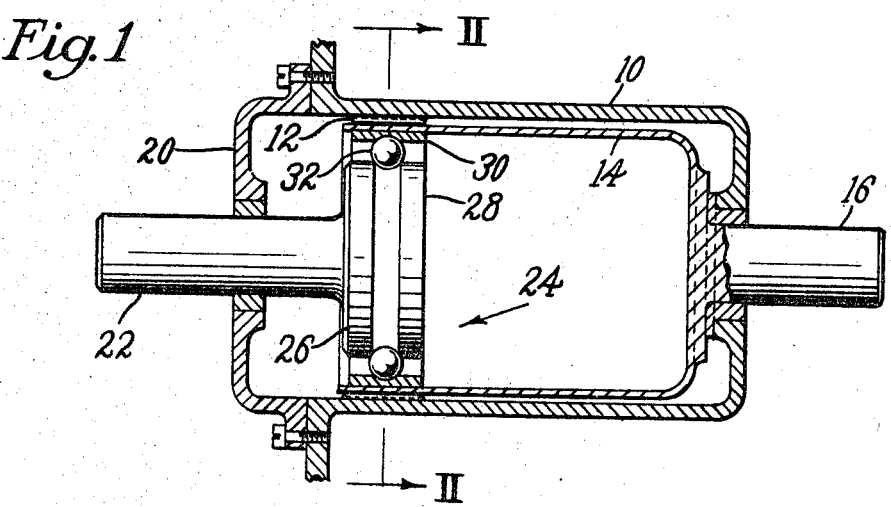
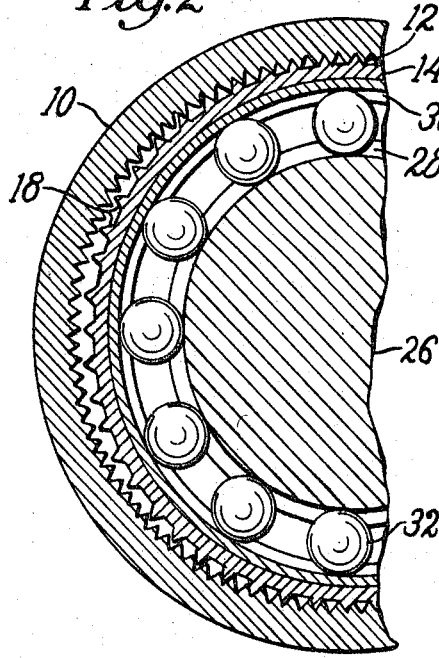
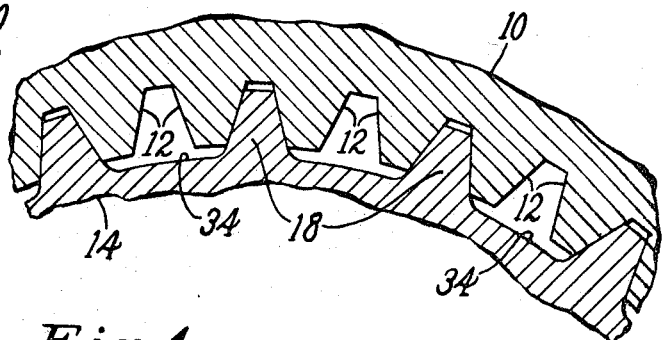
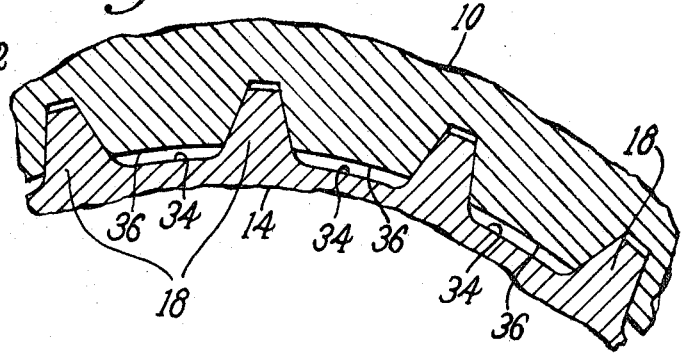
Inventor
John D. Hossfeld
By his Attorney
Carl E. Johnson

United States Patent Office 3,555,929
Patented Jan. 19, 1971

3,555,929
EXTENDED ROOT FLEXSPLINES
John D. Hossfeld, Peabody, Mass., assignor to USM Corporation, Flemington, N.J., a corporation of New Jersey
Filed Aug. 2, 1968, Ser. No. 749,861
Int. Cl. F16h 1/04
U.S. Cl. 74—640                                    1 Claim

ABSTRACT OF THE DISCLOSURE

A flexspline, the member carrying a circumferential wave and meshing with a coaxial circular spline to provide a harmonic drive type actuator, is given a novel, improved configuration much less susceptible to localized stresses at root sections of its teeth. This new flexspline permits greater radial deflection without excessive concentrated stresses, hence provides greater fatigue life and a lower practical limit of the drive ratios obtainable with harmonic drive actuators.

BACKGROUND OF THE INVENTION

This invention pertains to harmonic drive transmissions. As disclosed, for example, in United States Letters Patent 2,906,143, issued Sept. 29, 1959 upon an application filed in the name of C. Walton Musser, such actuators commonly include, in coaxial relation, a circular spline, a flexspline (with which this invention is especially concerned) radially deflected to mesh at spaced circumferential localities with the circular spline and not mesh at intermediate localities, and a wave generator for effecting the deflection of the flexspline and progressing the localities of meshing. One of these elements serves as a reaction member, one may serve as an input, and the third serves as an output member.

The lobar shape imposed on a flexspline is commonly elliptoidal though three lobes and more are at times employed. For the sake of simplicity, the description will herein be restricted to elliptoidal flexsplines. It will be assumed, accordingly, that the wave generator is in the form of an elliptoidal cam though it will be understood that wave generation may alternatively be obtained by electrical or hydraulic means. When an elliptoidal flexspline of conventional form is employed, its spline teeth (which may be external or internal) differ in number from those of the meshing circular spline by the number of cam lobes or a multiple of them, the outer element having the greater number.

In operating harmonic drive actuators, no serious tooth wear problem is usually encountered because of the large number of teeth sharing the torque load and the low level of sliding contact inherently experienced. In deflecting a flexspline as hitherto known into elliptoidal shape, however, bending strains and torque carrying forces occasionally produce stresses that may give rise to eventual fatigue failure. Major distortion and peak stress have been localized in root sections of the teeth. Consequently the tolerable degree of deflection has been limited, and the drive ratios practically attainable with previously allowable flexspline deflection have not been as low as often desired with this type of drive.

SUMMARY OF THE INVENTION

The improved flexspline provided by this invention aims to permit greater flexibility and hence allow lower ratio drives to be built which can sustain higher torque levels in the lower ratio range.

Considered from a different standpoint, another object of this invention is to provide a harmonic drive actuator wherein prospects of flexspline fatigue failure are unlikely to limit performance.

To the ends indicated the invention contemplates provision of a novel flexspline having its adjacent spline teeth spaced by a peripheral portion of generally uniform curvature at the root level, the tooth spacing being substantially more than the width of one of its spline teeth. For this purpose, in one approach herein illustrated, alternate spline teeth of a conventional flexspline, i.e., one formed by the use of spline cutters, may be removed to provide an extended arcuate span between adjacent remaining teeth, this span having a substantially uniform thickness and curvature wherein stress concentration of the magnitude previously experienced is avoided. Taking the next step, too, a harmonic drive circular spline cooperating with the proposed novel flexspline may then have its alternate spaces between spline teeth eliminated in like manner as herein indicated. Other configurations of flexsplines in accordance with this invention require special cutters to create the uniformly stressed, extended root sections desired.

BRIEF DESCRIPTION OF THE DRAWINGS

The foregoing and other features of the invention will now be more particularly described in connection with an illustrative embodiment, and with reference to the accompanying drawings thereof, in which:

FIG. 1 is an axial section of a harmonic drive actuator employing a novel extended root flexspline as herein described;

FIG. 2 is an enlarged section, with a portion broken away, taken on the line II—II in FIG. 1 showing flexspline meshing along major axis localities;

FIG. 3 is a further enlarged detail view of some of the meshing extended root flexspline teeth shown in FIG. 2; and FIG. 4 is a view corresponding to FIG. 3, the unused tooth space between circular spline teeth now being omitted.

DESCRIPTION OF THE PREFERRED EMBODIMENTS

It will be understood that the harmonic drive arrangement to be described has its wave generator means internal, but that the invention can as well apply to a harmonic drive transmission wherein the wave generator is externally disposed, i.e., operates on the outside of a flexspline.

In FIG. 1 a housing 10, assumed to be the stationary reaction member, is provided with internal circular spline teeth 12 (FIGS. 1–3) as has hitherto been customary. For meshing with the circular spline teeth 12 a tubular flexspline 14, assumed to be secured on an output shaft 16 journaled in the housing 10 has its flexspline teeth 18 projecting outwardly. Journaled in an end cap 20 of the housing 10 is an input shaft 22 coaxially carrying a conventional wave generator generally designated 24 and comprising in this case an elliptoidal cam 26, inner and outer races 28, 30, respectively, and a plurality of rolling elements 32. It will accordingly be understood that the rotating sinusoidal wave shape of the cam 26 is imparted to the flexspline 14 to effect progressive meshing of its teeth 18 with the circular spline teeth 12 along the major axis thereby driving the shaft 16 at reduced speed.

In contrast to conventional harmonic drive flexsplines which would mesh with the space between conventional successive circular spline teeth 12, the flexspline 14 is novel in that its adjacent spline teeth 18 are spaced by a peripheral portion 34 at the root level having generally uniform thickness and uniform curvature circumferentially, the spacing being substantially more than the width of one of its spline teeth. Kinematically the relationship of the novel flexspline 14 to the rigid circular spline 12 remains the same as with conventional flexsplines, but the extended root span 34 now affords marked improvement in fatigue life.

In conventional flexsplines flexibility varies circumferentially with the maximum occurring at the root of the teeth and the minimum occurring at its crest, a range factor of as much as eight over the tooth profile. Elliptoidal distortion of the flexsplines hitherto known localizes major distortion in the root sections between teeth thereby producing peak stresses limiting the deflection which can be tolerated. The provision of much broader, uniformly arcuate root sections or spans 34 between adjacent flexspline teeth, as shown in FIGS. 3 and 4, provides maximum flexibility of the flexspline circumference. Hence, when elliptoidally distorted the flexspline 14 is not subjected to nearly such highly localized distortions. Analysis has shown, for example, that the bending stress of an extended root-type flexspline 14 providing a reduction ratio of 50:1 is equivalent to that of a conventional flexspline producing a reduction ratio of 80:1, for instance. Moreover, whereas heretofore the practical lower reduction limit for harmonic drive actuators was about 50:1, the greater flexibility now feasible with extended root-type flexsplines will account for sustained harmonic drive performance in a lower ratio range where a large segment of the speed reducer market exists.

The configuration of the circular spline 12 and of the extended root flexspline 14 (FIG. 3) may be obtained by use of conventional spline tooth cutters. Clearly the extended root spans 34 define tooth spaces between the adjacent flexspline teeth greater than the width of a single flexspline tooth. In FIG. 4 the circular spline 12 is shown modified to a broadened tooth form having extended crests 36 compatible with the meshing extended root flexspline configuration. This modified circular spline exhibits slightly greater stiffness over a conventional circular spline, but it might be desirable to sacrifice this advantage to maintain conventional circular tooth profile, in which case the flexspline tooth spaces would have to be extended by the equivalent of full tooth widths. This is to say that, in effect, one out of two or two out of three flexspline teeth would be eliminated to create the extended root section, special cutters being employed. The resultant flexspline would mesh properly with existing circular splines.

In a method aspect the present invention comprises, therefore, lowering the drive ratio of an existing harmonic drive actuator by improving the flexibility of its flexspline which can be accomplished simply by removing alternate flexspline teeth thereby creating broadened root spans 34 at the root level.

Having thus described my invention, what I claim as new and desire to secure by Letters Patent of the United States is:

1. A harmonic drive actuator comprising a flexspline and a coaxial circular spline meshing at circumferentially spaced localities, the width of the circular spline teeth along the pitch circle being greater than the width of the flexspline teeth along that circle, whereby the root localities of the flexspline teeth are subjected to lower stress concentration than when the widths of harmonic drive circular spline teeth and cooperating flexspline teeth are substantially equal.

References Cited
UNITED STATES PATENTS

| | | | |
|---|---|---|---|
| 2,188,025 | 1/1940 | Weiss | 74—243X |
| 2,906,143 | 9/1959 | Musser | 74—640 |
| 2,931,248 | 4/1960 | Musser | 74—640 |
| 3,068,719 | 12/1962 | Singelmann | 74—640 |

CARLTON R. CROYLE, Primary Examiner

T. C. PERRY, Assistant Examiner